Jan. 30, 1951 — A. B. MAXAM ET AL — 2,540,034

MODEL AIRPLANE WHEEL

Filed Nov. 12, 1946

INVENTORS
ALLEN B. MAXAM
JOHN R. TOOTHAKER
BY
Christie & Argus
ATTORNEYS

Patented Jan. 30, 1951

2,540,034

UNITED STATES PATENT OFFICE 2,540,034

MODEL AIRPLANE WHEEL

Allen B. Maxam and John R. Toothaker, Burbank, Calif.

Application November 12, 1946, Serial No. 709,180

2 Claims. (Cl. 301—122)

This invention relates to model airplanes. More particularly the invention relates to a wheel assembly to be used on model airplanes.

Model airplanes may be variously constructed, but substantially all are provided with landing gear, and in a great majority of cases this landing assembly comprises a fixed axle upon which two or more landing wheels are mounted in such a manner that they rotate about the axle. In some instances each of the landing wheels may be supported on separate axles affixed directly to the airplane body independently of each other. Alternatively, a single stationary axle upon which two wheels may be mounted is affixed to the plane body.

Accordingly it is a primary object of the present invention to provide a simple and mechanically efficient wheel assembly for use in model airplane construction in which stationary axles are to be employed.

The wheel of the invention comprises a cylindrical hub provided with means for mounting a solid or pneumatic rubber tire on its periphery. A centrally located circular bore proceeds longitudinally from one transverse face of the hub to a point approaching the opposite transverse face. The axle upon which the wheel is to be mounted is provided with a sleeve, means being provided to retain the sleeve on the axle and for affixing the wheel hub to the sleeve so that the wheel and sleeve may rotate about the stationary axle.

Additional features and advantages of the invention will become apparent from the following detailed description thereof taken in relation to the accompanying drawings in which.

Figure 1:
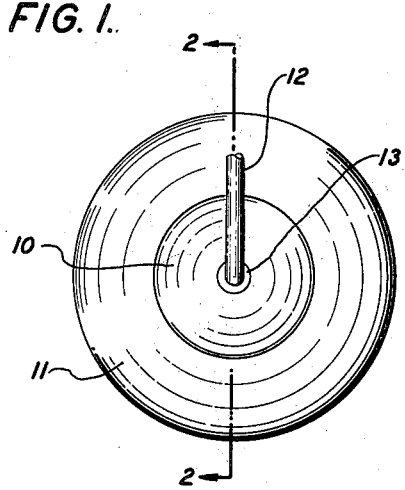
Fig. 1 is a side elevation of the wheel of the invention taken from the inside thereof.

The wheel of the invention comprises a hub 10 upon which is mounted a tire 11. The tire 11 is preferably composed of rubber and may be either solid rubber or a pneumatic tire. In most instances a solid rubber tire is highly satisfactory for model airplanes. Projecting from the center of the inside face of the hub 10 is the axle 12 upon which is mounted the sleeve 13.

The sleeve 13 is held within the bore 14 of the hub 10 by the set screw 15 projecting transversely from the periphery of the hub to the center bore 14 and engaging the peripheral groove 16 on the sleeve 13.

At the terminal end of the axle 12 there is provided a flange 17 which is preferably composed of a soft metal such as solder directly affixed to the end of the axle 12. This cap or flange is affixed to the axle after the axle has been inserted in the sleeve 13 and acts to hold the sleeve on the axle and also as a bearing surface. Spacing the end of the axle from the sleeve 13 is the bushing 18.

The hub 10 which comprises a cylindrical member preferably with bulged transverse faces 10a and 10b is provided with a centrally located peripheral groove 20 adapted to form a receptacle for a corresponding ridge 21 on the internal circumference of the tire 11.

Figure 2:
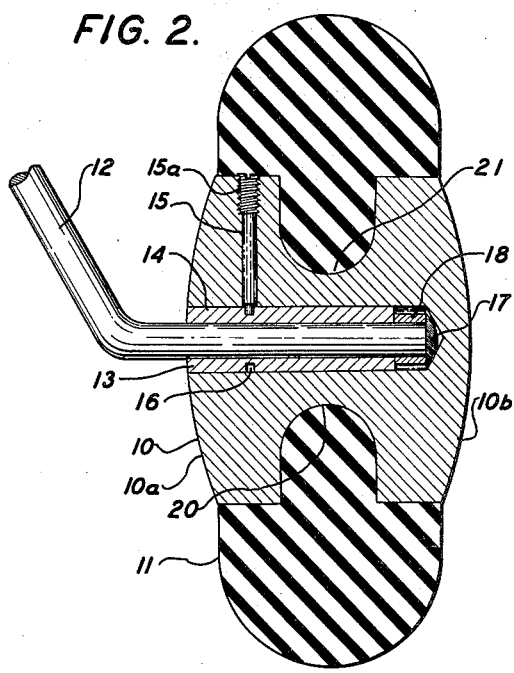
Fig. 2 is a sectional elevation through the wheel taken on the line 2—2 of Fig. 1.

In assembling the wheel as shown in Figs. 1 and 2 the axle 12 is affixed to the model airplane, not shown. The axle as shown in Fig. 2 is of the type which is affixed directly to the plane and which supports only one of the two wheels, there being a companion and identical axle supporting the second wheel. It is, of course, to be understood that the axle 12 may be straight and may have mounted thereon both landing wheels and may be affixed to the plane body by auxiliary structural members. The sleeve 13 and the bushing 18 are mounted successively on the axle 12. The flange or head 17 is then affixed to the axle 12 either by direct soldering, a threaded screw, by peening the end of the axle or the like. The hub 10 is next mounted on the sleeve 13 with the set screw 15 in the unscrewed position. The set screw is then caused to register with the groove 16 of the sleeve 13 whereby the head 15a of the screw 15 is depressed so as to be flush or imbedded in the periphery of the hub 10. Lastly the tire 11 is stretched over the periphery of the hub 10, the ridge 21 engaging the corresponding peripheral groove 20 in the hub 10.

Figure 3:
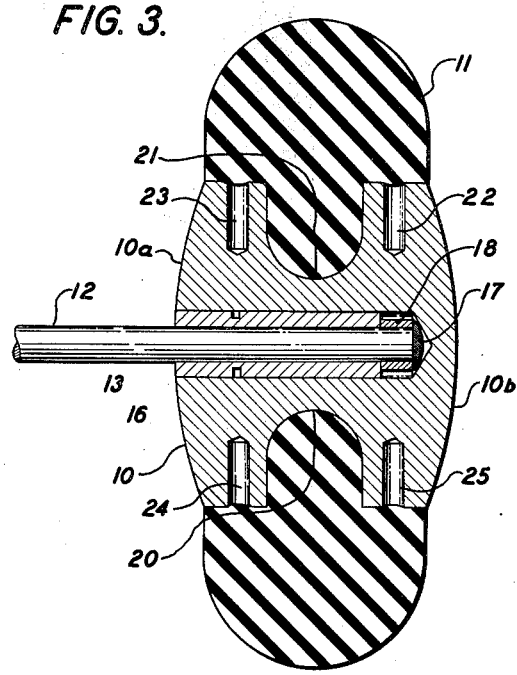
Fig. 3 is a sectional elevation showing a modified form of the wheel.

In Fig. 3 there is shown a cross-sectional elevation of a modified form of the wheel assembly as shown in Figs. 1 and 2. In this embodiment of the invention the hub 10 is provided with a plurality of holes 22, 23, 24, and 25 drilled transversely to the periphery of the hub 10 intermediate between the outside edges of the groove 20 and the transverse faces 10a and 10b of the hub. Although only four such holes may be shown in the elevational view of Fig. 3, it is to be understood that I may employ any number of such holes which function to exert a suction force on the inside circumference of the tire 11, thereby causing a more secure engagement of the tire with the hub end.

The hub 10 as shown in Figs. 1, 2, and 3 may be made of any desired material but I have found that in the modifications shown in these figures that metal hubs are the most satisfactory and particularly preferable are the hubs made of such light metals as aluminum, magnesium, and alloys of these metals. The lighter metals are of course preferred by reason of the fact that model airplanes are constructed of as light materials as possible. Although wood may also be employed as in the hub as shown in these figures, I have provided an additional embodiment of the wheel particularly adapted to use where wood is in the preferred material of construction.

Figure 4:
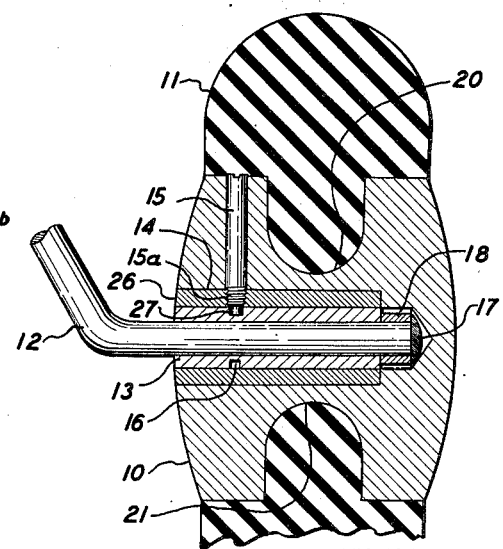
Fig. 4 is a sectional elevation showing a wheel in which the hub is fabricated from wood rather than metal and illustrating the modifications thereof particularly suitable for usage with a wooden hub.

Fig. 4 is a sectional elevation of a further embodiment of the invention in which the hub 10 is constructed of a light wood such as balsa wood, cork wood, polar or the like and preferably a wood having a density of less than .50 gram per cu. centimeter. Because of the fact that wood does not possess the mechanical strength exhibited by the metallic hubs I have provided a modified means of mounting the wheel on the axle 12 which does not make use of the wood itself to engage the axle within the wheel. In this embodiment the transverse bore 14 is of larger diameter than the bore in the metallic hubs and there is provided in addition to the sleeve 13 a surrounding sleeve 26. The sleeve 13 is provided as in the other embodiments with the peripheral groove 16 and the hub 10 is provided with the transverse bore through which the set screw 15 projects from the outer periphery to the center bore 13. As shown there are no threads provided in the wood of the hub but the threads 15a of the set screw 15 engage correspondingly threads in the outer sleeve 26 and the tip 27 of the set screw then registers in the groove 16 of the sleeve 13. The bushing 18 and the cap or rivet-like member 17 are provided in the same manner as in the foregoing embodiments. The hub is also provided with the peripheral groove 20 and the tire 11 is provided with the ridge 21 on the internal circumference thereof to engage the groove 20. The embodiment shown in Fig. 4 may be further altered by the provision of peripheral transverse holes in the wooden hub similar to those shown in the embodiment of Fig. 3.

In an alternative means of engaging the sleeve 13 within the bore 14 of the hubs shown in Figs. 2, 3, and 4 the set screw 15 may be replaced by a simple plunger pin which rides in a bore provided therefore such as the bore provided for the set screw 15. This plunger pin is made such a length that when registering in the groove 16 of the sleeve 13 the top thereof is flush with the outer periphery of the hub 10 and the pin is maintained within the hub by the pressure exerted thereon by the inside face of the tire 11. If this embodiment is employed the hubs shown in Figs. 2 and 3, may be equally satisfactorily produced from wood as from metal inasmuch as there will be no threading required.

Many modifications of the apparatus of the invention may occur to those skilled in the art from the foregoing description and the accompanying drawing without departing from the spirit or scope of the invention as disclosed in the foregoing description and in the following claims.

We claim:

1. A wheel assembly for model airplanes comprising a hub and an axle, said hub comprising a wooden cylinder provided with a partial longitudinal centrally located bore, a transverse bore projecting from the circumference of said hub to said longitudinal bore and a set screw inserted in said transverse bore, said axle being provided with a sleeve maintained thereon by a cap of soft metal affixed to the end of said axle projecting beyond the inside edges of said sleeve but not beyond the outside edges thereof, said sleeve being provided with a peripheral groove so located as to be engageable by said set screw when said hub is mounted on said sleeve, a second sleeve inserted in said longitudinal bore in said hub and around the first-mentioned sleeve, said second sleeve being provided with a transverse threaded hole registerable with said transverse bore in said hub and within said peripheral groove, said threads being engageable with corresponding threads on said set screw so that the set screw extends through the hub and second sleeve and into the peripheral groove of the first-mentioned sleeve.

2. A wheel assembly according to claim 1 wherein a bushing member of smaller outside dimensions than said first mentioned sleeve is inserted on said axle between said sleeve and said cap.

ALLEN B. MAXAM.
JOHN R. TOOTHAKER.

REFERENCES CITED

The following references are of record in the file of this patent:

UNITED STATES PATENTS

| Number | Name | Date |
|---|---|---|
| 288,508 | Stoddard | Nov. 15, 1883 |
| 337,922 | Brinton | Mar. 16, 1886 |
| 698,110 | Foy | Apr. 22, 1902 |
| 1,386,124 | Littlefield | Aug. 2, 1921 |
| 1,900,835 | Meredith | Mar. 7, 1933 |
| 2,280,568 | Brown | Apr. 21, 1942 |
| 2,355,943 | Beede | Aug. 15, 1944 |

FOREIGN PATENTS

| Number | Country | Date |
|---|---|---|
| 404,423 | Great Britain | Jan. 18, 1934 |